(12) United States Patent
Leighton et al.

(10) Patent No.: US 7,111,061 B2
(45) Date of Patent: Sep. 19, 2006

(54) GLOBAL LOAD BALANCING ACROSS MIRRORED DATA CENTERS

(75) Inventors: F. Thomson Leighton, Newtonville, MA (US); Daniel M. Lewin, deceased, late of Charlestown, MA (US); by Anne E. Lewin, legal representative, Charlestown, MA (US); Ravi Sundaram, Cambridge, MA (US); Rizwan S. Dhanidina, Cambridge, MA (US); Robert Kleinberg, Somerville, MA (US); Matthew Levine, Somerville, MA (US); Adrian M. Soviani, Cambridge, MA (US); Bruce Maggs, Pittsburgh, PA (US); Hariharan Shankar Rahul, Cambridge, MA (US); Srikanth Thirumalai, West Newton, MA (US); Jay Gunvantrai Parikh, Redwood City, CA (US); Yoav O. Yerushalmi, La Jolla, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 512 days.

(21) Appl. No.: 09/866,897

(22) Filed: May 29, 2001

(65) Prior Publication Data

US 2002/0129134 A1    Sep. 12, 2002

Related U.S. Application Data

(60) Provisional application No. 60/208,014, filed on May 26, 2000.

(51) Int. Cl.
*G06F 15/173* (2006.01)
*G06F 15/16* (2006.01)

(52) U.S. Cl. .............. 709/224; 709/223; 709/238; 709/249

(58) Field of Classification Search ........ 709/220–221, 709/223–225, 227, 229, 232–235, 203, 238–242
See application file for complete search history.

(56) References Cited

U.S. PATENT DOCUMENTS

| | | | |
|---|---|---|---|
| 5,991,809 | A | 11/1999 | Kriegsman |
| 6,003,030 | A | 12/1999 | Kenner et al. |
| 6,108,703 | A | 8/2000 | Leighton et al. |
| 6,112,257 | A * | 8/2000 | Mason et al. .............. 710/18 |
| 6,119,143 | A | 9/2000 | Dias et al. |
| 6,122,666 | A | 9/2000 | Beurket et al. |
| 6,185,598 | B1 | 2/2001 | Farber et al. |
| 6,263,368 | B1 * | 7/2001 | Martin .................. 709/224 |
| 6,295,275 | B1 | 9/2001 | Croslin |
| 6,327,622 | B1 * | 12/2001 | Jindal et al. ............ 709/228 |
| 6,360,262 | B1 | 3/2002 | Guenther et al. |
| 6,405,252 | B1 | 6/2002 | Gupta et al. |
| 6,442,140 | B1 | 8/2002 | Kirschenbaum |
| 6,484,143 | B1 | 11/2002 | Swildens et al. |
| 6,502,125 | B1 | 12/2002 | Kenner et al. |

(Continued)

*Primary Examiner*—Ario Etienne
*Assistant Examiner*—Hussein Elchanti
(74) *Attorney, Agent, or Firm*—David H. Judson (57) ABSTRACT

The invention is an intelligent traffic redirection system that does global load balancing. It can be used in any situation where an end-user requires access to a replicated resource. The method directs end-users to the appropriate replica so that the route to the replica is good from a network standpoint and the replica is not overloaded. The technique preferably uses a Domain Name Service (DNS) to provide IP addresses for the appropriate replica. The most common use is to direct traffic to a mirrored web site.

12 Claims, 5 Drawing Sheets

U.S. PATENT DOCUMENTS

| | | |
|---|---|---|
| 6,546,423 B1 * | 4/2003 | Dutta et al. .................. 709/225 |
| 6,553,413 B1 | 4/2003 | Leighton et al. |
| 6,578,077 B1 | 6/2003 | Rakoshitz et al. |
| 6,587,878 B1 | 7/2003 | Merriam |
| 6,665,706 B1 | 12/2003 | Kenner et al. |
| 6,769,030 B1 | 7/2004 | Bournas |
| 6,820,133 B1 | 11/2004 | Groove et al. |
| 2004/0078490 A1 | 4/2004 | Anderson et al. |

* cited by examiner

GLOBAL LOAD BALANCING ACROSS MIRRORED DATA CENTERS

This application is based on and claims priority from Provisional Application Ser. No. 60/208,014, filed May 26, 2000.

RELATED APPLICATIONS

This application is related to the following commonly-owned applications: "Method for Generating A Network Map," Ser. No. 09/866,884, filed May 29, 2001; "Method For Predicting File Download Time From Mirrored Data Centers in a Global Computer Network," Ser. No. 09/867,141, filed May 30, 2001; and "Method For Extending A Network Map," Ser. No. 09/866,896, filed May 29, 2001.

BACKGROUND OF THE INVENTION

1. Technical Field

The present invention relates generally to high-performance, fault-tolerant content delivery and, in particular, to systems and methods for balancing loads from mirrored data centers within a global computer network.

2. Description of the Related Art

It is known to store Web-based content in mirrored data centers and to load-balance such content requests to data centers based on network traffic conditions. Existing global load balancing products use several different approaches for building a map of Internet traffic conditions. One approach uses border gateway protocol (BGP) data. BGP-based routing, however, can be sub-optimal because the BGP data can be very coarse. Other approaches attempt to compute an optimal mapping in real-time and then cache the mapping information. This technique can lead to poor turnaround time during an initial "hit" and potentially stale mappings on successive requests. In addition, the quality of the measurement to the endpoint tends to be noisy. Because of the deficiencies of these mapping techniques, the resulting load balancing is less than effective.

Current load balancing devices are typically incapable of computing an optimal map for an entire computer network such as the entire Internet. Presently, the Internet has hundreds of millions of hosts and routers. Estimating the connectivity time of the entire Internet to a set of mirrored data centers, such as by evaluating the network path between a server and each and every host or router, would be incredibly time-consuming and would consume far too much bandwidth. Such techniques, of course, are impractical when real-time routing decisions are required.

Further, such measurements tend to be noisy and inaccurate, and they can annoy system administrators whose firewalls are contacted. Local name servers behind firewalls would not be reached and slow connectivity over the "last mile" (e.g., due to dial-up connections and the like) tend to confuse the connectivity picture. Consequently, there remains no efficient technique in the prior art for generating an optimal network connectivity map that can be used for providing intelligent traffic redirection in conjunction with load balancing across mirrored data centers located around the globe.

BRIEF SUMMARY OF THE INVENTION

The invention is an intelligent traffic redirection system that does global load balancing. It can be used in any situation where an end-user requires access to a replicated resource. The method directs end-users to the appropriate replica so that the route to the replica is good from a network standpoint and the replica is not overloaded. The technique preferably uses a Domain Name Service (DNS) to provide IP addresses for the appropriate replica. The most common use is to direct traffic to a mirrored web site. Other uses are to direct caches to storage servers, to direct streaming servers to signal acquisition points, to direct logging processes to log archiving servers, to direct mail processes to mail servers, and the like.

In a preferred embodiment, the method relies on a network map that is generated continuously for the user-base of the entire Internet. The problems inherent in the prior art are overcome by vastly reducing the dimensionality of the problem of estimating the relative connectivity to a set of mirrored data centers. A "data center" is typically located at a telecommunications facility that leases space and sells connectivity to the Internet. Multiple content providers may host their web sites at a given data center. Instead of probing each local name server (or other host) that is connectable to the mirrored data centers, the network map identifies connectivity with respect to a much smaller set of proxy points, called "core" (or "common") points. A core point then becomes representative of a set of local name servers (or other hosts) that, from a data center's perspective, share the point. Each set of mirrored data centers has an associated map that identifies a set of core points.

According to a preferred embodiment of the invention, a core point is discovered as follows. An incremental trace route is executed from each of the set of mirrored data centers to a local name server that may be used by client to resolve a request for a replica stored at the data centers. An intersection of the trace routes at a common routing point is then identified. Thus, for example, the common routing point may be the first common point for the trace routes when viewed from the perspective of the data centers (or the last common point for the trace routes when viewed from the perspective of the local name server). The common routing point is then identified as the core point for the local name server. A core point is identified for other local name servers (or other hosts) in the same manner. Thus, a given set of mirrored data centers may have associated therewith a set of core points that are then useful in estimating the relative connectivity to the set of data centers, as is described below.

Once core points are identified, a systematic methodology is used to estimate predicted actual download times to a given core point from each of the mirrored data centers. According to the invention, ICMP (or so-called "ping"0 packets) are used to measure roundtrip time (RTT) and latency between a data center and a core point. Thus, for example, a core point may be pinged periodically (e.g., every 30 seconds) and the associated latency and packet loss data collected. Using such data, an average latency is calculated, preferably using an exponentially time-weighted average of all previous measurements and the new measurement. A similar function is used to calculate average packet loss. Using the results, a score is generated for each path between one of the data centers and the core point. The score may be generated by modifying an average latency, e.g., with a given penalty factor, that weights the average latency in a unique way to provide a download prediction. Whichever data center has the best score (representing the best-performing network connectivity for that time slice) is then associated with the core point.

A full network map is created by generalizing a core point/data center data set to an IP block/data center data set.

This "unification" fills in and reduces the size of the network map and enables traffic redirection to be carried out for new local name servers.

The generated network map is then used to effect traffic redirection and load balancing. In particular, when a user's local name server makes a request for the content provider's web site (located within a set of mirrored data centers), the method preferably uses the network map to return to the local name server a list of web server IP addresses at the optimal data center. If ping data is not available for the user's local name server (of it the IP block has not been extended through unification), BGP or geo-routing can be used to make a default routing decision. Content provider-specified load balancing preferences may also be readily enforced across the data centers and/or within a particular data center.

The foregoing has outlined some of the more pertinent objects and features of the present invention. These objects should be construed to be merely illustrative of some of the more prominent features and applications of the invention.

BRIEF DESCRIPTION OF THE DRAWINGS

For a more complete understanding of the present invention and the advantages thereof, reference should be made to the following Detailed Description taken in connection with the accompanying drawings, in which.

DETAILED DESCRIPTION OF THE PREFERRED EMBODIMENT

By way of brief background, it is known in the art for a Web content provider to distribute or "mirror" its Web site to ensure that the site is always available and providing acceptable performance for a global customer base. Once a Web site is distributed, global traffic management (GTM) solutions typically are used to direct users to the various mirror sites. GTM solutions use a variety of methods to determine which is the "best" mirrored site in which to direct a user. Because Internet conditions are constantly changing, however, the "best" site for a particular user also varies with these conditions. The present invention is a GTM solution that maximizes availability and performance of a mirrored delivery site.

In a preferred embodiment now described, the global traffic management solution is a managed service provided by a service provider, such as a content delivery network (CDN) service provider (CDNSP). As is well-known, a CDN is a network of geographically distributed content delivery nodes that are arranged for efficient delivery of digital content (e.g., Web content, streaming media and applications) on behalf of third party content providers. A request from a requesting end user for given content is directed to a "best" replica, where "best" usually means that the item is served to the client quickly compared to the time it would take to fetch it from the content provider origin server. Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet Points of Presence, network access points, and the like) for delivering copies of content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently-accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system. A well-known commercial CDN that provides web content and media streaming is provided by Akamai Technologies, Inc. of Cambridge, Mass.

Figure 1:
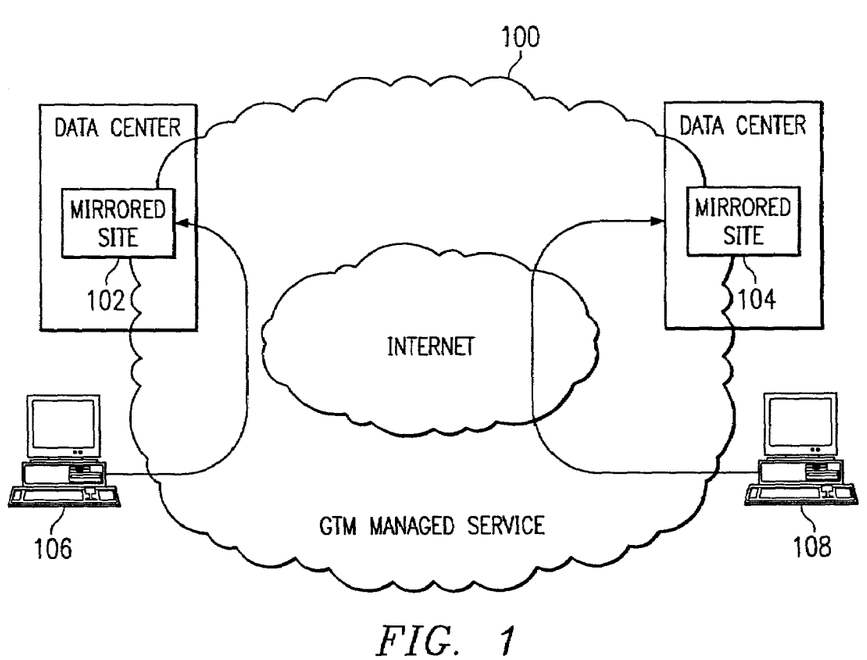
FIG. 1 is an illustration of a mirrored Web site that is managed by a global traffic manager according to the present invention.
Figure 2:
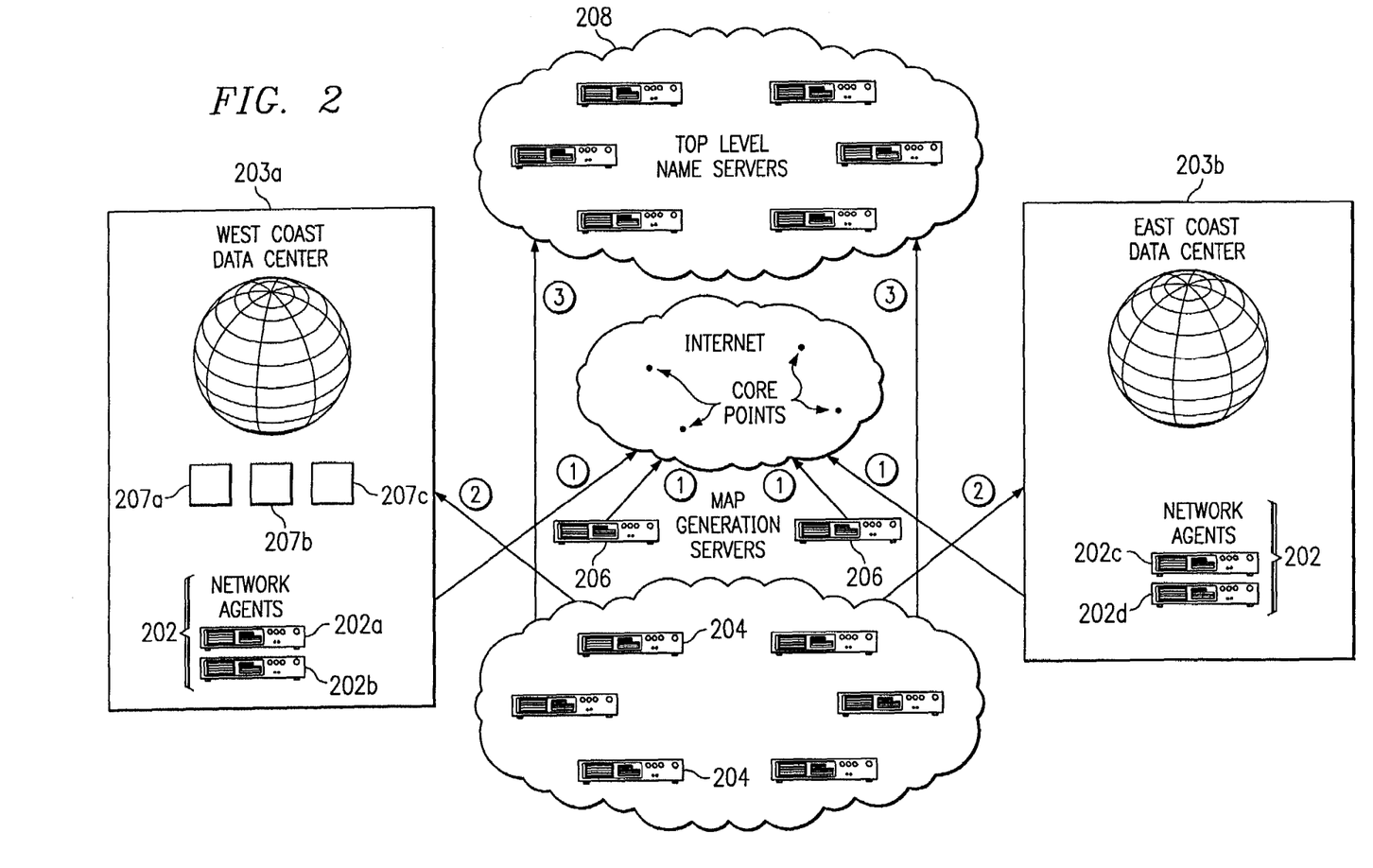
FIG. 2 is a high level illustration of the components of the GTM service.

Thus, in one embodiment, the present invention implements a managed service for global load balancing of a content provider's mirrored Web sites. FIG. 1 illustrates the basic implementation environment. In this example, the global traffic management service 100 provides global traffic management for a content provider running a pair of mirror Web sites 102 and 104 (identified by the same domain, e.g., www.akamai.com). The GTM service 100 provides improved responsiveness for end users 106 and 108 accessing the Web site by directing them to the best performing mirrored site. FIG. 2 illustrates the high level technical architecture of the GTM service which, as noted above, is implemented by a CDNSP or other entity (the "managed service provider") as a managed service on behalf of content providers running mirrored Web sites. Of course, one of ordinary skill will appreciate that the inventive functionality may also be implemented in whole or in part as a product-based solution.

For illustrative purposes only, and with reference to FIG. 2, a preferred GTM service 200 comprises a number of components: a set of network agents 202, a set of web server agents 204, a set of map generation servers 206, and a set of name servers 208. Each such component typically is a server, such as a Pentium-based box running the Linux operating system and having application software for carrying out the functions described below, or one or more processes executing on such a machine. As will be described, data is collected by the network agents and the web server agents and delivered to the map generation servers. The map generation servers analyze the data, and at least one map server produces a map that assigns name server IP address/blocks to regions. At least one map is then uploaded to the name servers. When an end user requests access to a mirrored site domain being managed by the service, one of the name servers hands back an IP delegation that represents a "best" data center to which the user should connect.

The particular placement of the components as illustrated in the drawing is representative, and there is no requirement that any particular entity own or control a particular machine. In this embodiment, a content provider has network agents located in or near their network segment within each respective data center that hosts the mirrored Web site. Thus, for example, a pair of network agents 202a and 202b are dedicated to the content provider in data center 203a, and a pair of network agents 202c and 202d are dedicated to the content provider in data center 203b, although this is not required. These network agents preferably share the same network connection as the content provider's web servers. Thus, e.g., network agents 202a and 202b in data center 203a share network connections with the content provider's web servers 207a–c. Where the managed service provider operates a CDN, the set of network agents may be deployed in data centers in which the CDN is deployed. Of course, multiple content providers may host their web sites at a given data center and share network agents. Thus, a given network agent may collect data once for a first content provider at a given location and then share the data across all other content providers co-located in the same data center. A data center typically is located at a telecommunications facility (e.g., Exodus, Frontier Global, UUUNet, and the like) that leases space and sells connectivity to the Internet.

A network agent has two (2) primary functions: running "core point" discovery (CPD) to determine a set of "core" points, and monitoring network performance to each core point. As will be seen, the inventive system continuously pre-computes optimal maps, preferably for the user base of the entire Internet. It is able to do this effectively because the system reduces the scale of the problem by aggregating parts of the Internet and representing them with "core" points. A core point typically is representative of a set of local name servers (or other hosts) that, from the perspective of a given network location (e.g., a data center), share the point. Typically, a core point is a router on the Internet, although this is not a requirement. The information collected from the core point discovery process is fed to the map generation servers on a relatively frequent basis, e.g., one every thirty (30) seconds, to identify down routes, congestion, route changes, and other network traffic conditions that may impair or effect connectivity to a data center at which a particular mirrored site is hosted.

According to a preferred embodiment of the invention, a core (or "common") point is discovered as follows. An incremental trace route is executed from each of the set of 45 mirrored data centers to a local name server that may be used by client to resolve a request for a replica stored at the data centers. An intersection of the trace routes at a common routing point is then identified. Thus, for example, the common routing point may be the first common point for the trace routes when viewed from the perspective of the data centers (or the last common point for the trace routes when viewed from the perspective of the local name server). The common routing point is then identified as the core point for the local name server. A core point is identified for other local name servers (or other hosts) in the same manner. Thus, a given set of mirrored data centers may have associated therewith a set of core points that are then useful in estimating the relative connectivity to the set of data centers, as is described below.

Figure 3:
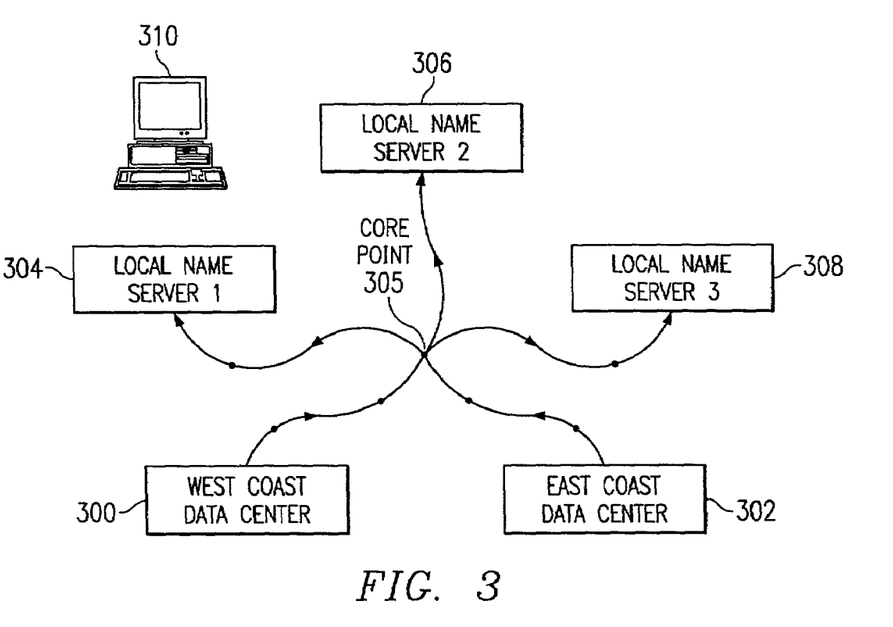
FIG. 3 is a simplified illustration of a core point discovery process of the invention.
Figure 7:
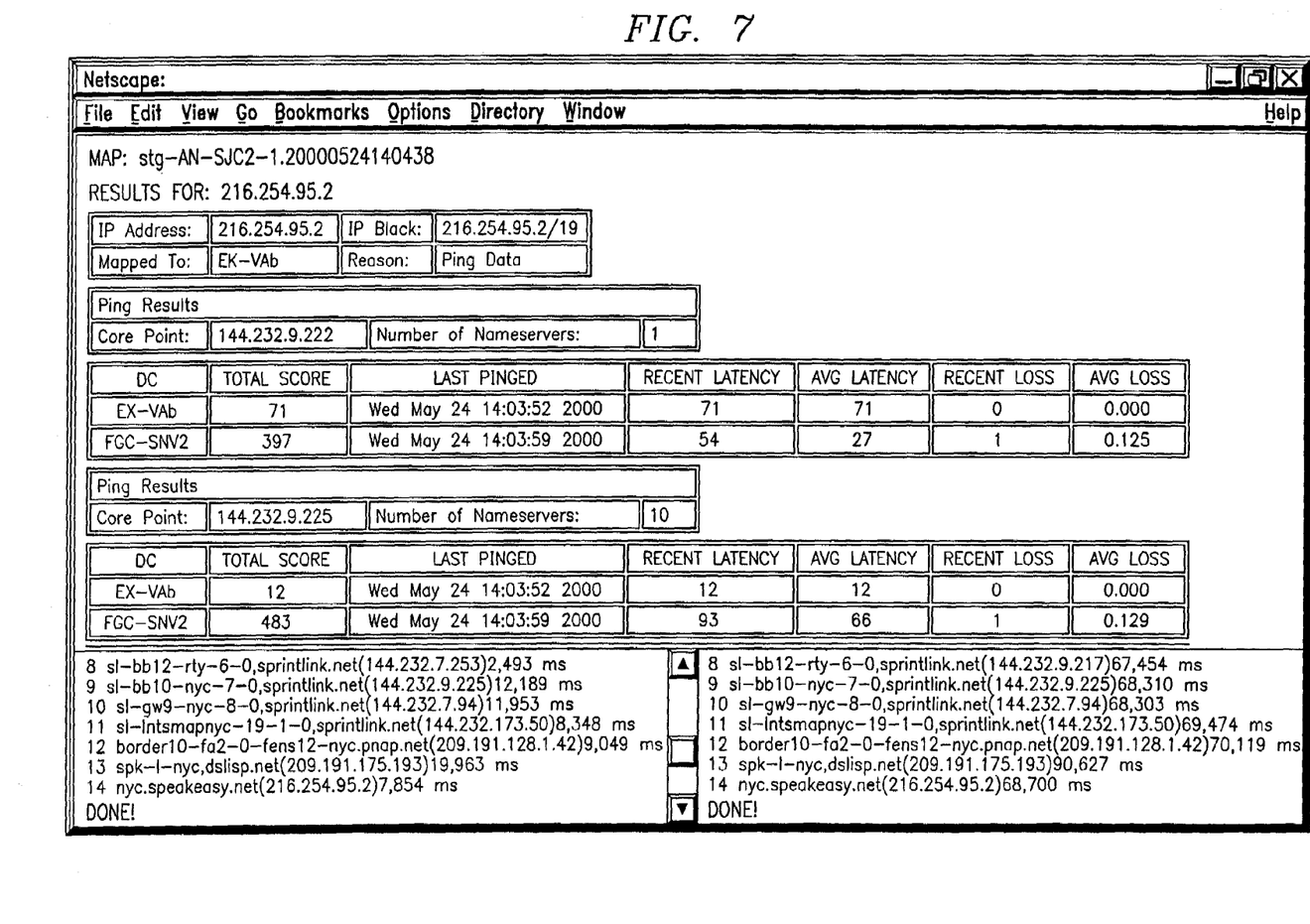
FIG. 7 is a representative traceroute generated during the core point discovery process.

FIG. 3 is a simplified diagram of the core point discovery process, in accordance with one embodiment of the invention. For purposes of example only, in FIG. 3, the data center 300 corresponds to a data center located on the West Coast and the data center 302 corresponds to a data center located on the East Coast. Data center locations, of course, are merely representative. Each data center can host a mirror site for a given content provider. According to the invention, a core point 305 is discovered as follows. An incremental trace route is executed from each of a set of mirrored data centers 300, 302 to local name servers 304, 306, 308 that may be used by a client machine 310. For example, in FIG. 3, the network agent (not shown) has executed a first set of traceroutes, between the data center 300 and the local name servers 304, 306 and 308, and a second set of traceroutes between the data center 302 and the local name servers 304, 306 and 308. The network path between the respective data center and the local name server(s) contain router hops, as is well known. To locate a core point, the network agent identifies a location at or close to the intersection of the trace routes at a common routing point, which is shown in FIG. 3 as a core point 305. For example, the common routing point may be the first common point for the trace routes when viewed from the perspective of the data centers 300 and 302 (or the last common point for the traceroutes when viewed from the perspective of the local name server 304). The common routing point is then identified as the core point 305 for the local name server. FIG. 7 illustrates a representative core point discovery process trace.

For example, if two or more different paths are traced and the same route (or routes) appears on at least a portion of all of the paths, the common routing point can lie somewhere along that common portion of the route. As noted above, generally the core point is the first common point for the trace routes when viewed from the perspective of the data centers, which is the same as the last common point for the trace routes when viewed from the perspective of the local name server.

The core point 305 need not be situated at the "exact" intersection of the trace routes. It can, for example, be located near or substantially near the intersection. It can also be located adjacent to the intersection, or it can be located at any nearby point such 10 that measurements made to the point are representative of the measurements made at the intersection.

The network agent identifies other core points for other local name servers (or other hosts) in the same manner. Thus, a given set of mirrored data centers may have associated therewith a set having one or more core points that are then useful in estimating the relative connectivity to the set of data centers, as is described below. If network paths on the Internet are changing frequently, a network agent preferably runs core point discovery with some frequency.

As noted above, a network agent also performs the function of periodically checking the core points assigned to one or more local name servers that already have been mapped. This process is now described.

Network agents preferably make measurements to core points using Internet Control Messaging Protocol (ICMP) (or so-called "ping" packets) to evaluate such information as round trip times (RTTs), packet loss, and number of router hops. Thus, using the example in FIG. 3, a given network agent periodically "pings" a core point (e.g., every 30 seconds) and collects the associated latency and packet loss. Using such data, the network agent calculates an average latency. In one embodiment, the network agent calculates average latency using an exponentially time-weighted average of all previous measurements and the new measurement. The network agent uses a similar function to calculate average packet loss. This calculation is described in more detail below. Using the results, the network agent generates a "score" for each path between one of the data centers and the core point. The score is generated, for example, by modifying an average latency with a given penalty factor that weights the average latency in a unique way to provide a download prediction. Whichever data center has the best score (representing the best-performing network connectivity for that time slice) is then associated with the core point.

Referring back to FIG. 2, the web server agents 204 do test downloads to either all the web server IP addresses or to the local load balancing devices to test for availability or "aliveness" of the mirrored sites (i.e., per data center mirror or web server). Typically, a web server agent tests an object, e.g., a twenty (20) byte file available on the web server via an HTTP GET request, and check for errors and download times. In a representative embodiment, the measurements are taken periodically, e.g., every ten (10) seconds, although preferably a customer can change the timeout. An IP address is declared "dead" if more than a given percentage of the web server agents are unable to download the test object within the timeout threshold. This allows customers to set a threshold on response times so that the system can direct traffic away from data centers where performance suffers. The web server gents are preferably dispersed in co-location facilities, which are dispersed geographically and on a network basis. Moreover, one skilled in the art will recognize that the described functions of the web server agent could be performed by another component, such as the network agent, the map generation server, or some other server. Moreover, neither the web server agent nor its functions (such as testing the aliveness of a data center) are necessary for certain embodiments of the invention.

The map generation servers 206 receive data from the network agents and the web server agents and use this data to generate maps, which describe the mirrored site that is optimal for each IP address block. In a preferred embodiment, a map is achieved by evaluating web server agent data, a time-weighted average of latency and packet loss, and BGP and geo information. Preferably, there are two (2) map generation server processes for each customer, and maps are generated periodically, e.g., every 3–5 minutes. Although not a limitation, preferably the map generation servers associate IP blocks with Internet "regions" such that a given map associates an IP block with a region number. Another data file is then used to associate region number to physical IP address. In a representative embodiment, maps (which associate IP block to region #) are generated every few minutes and then uploaded to the name servers.

The name servers 208 hand out to the requesting end user the IP address(es) of the optimal data center. Typically, the name server response have a time to live (TTL) of about five (5) minutes, although this value may be customer-configurable. In a representative embodiment, the name servers are the same name servers used by the CDNSP to facilitate routing of end user requests to CDN content servers.

Figure 4:
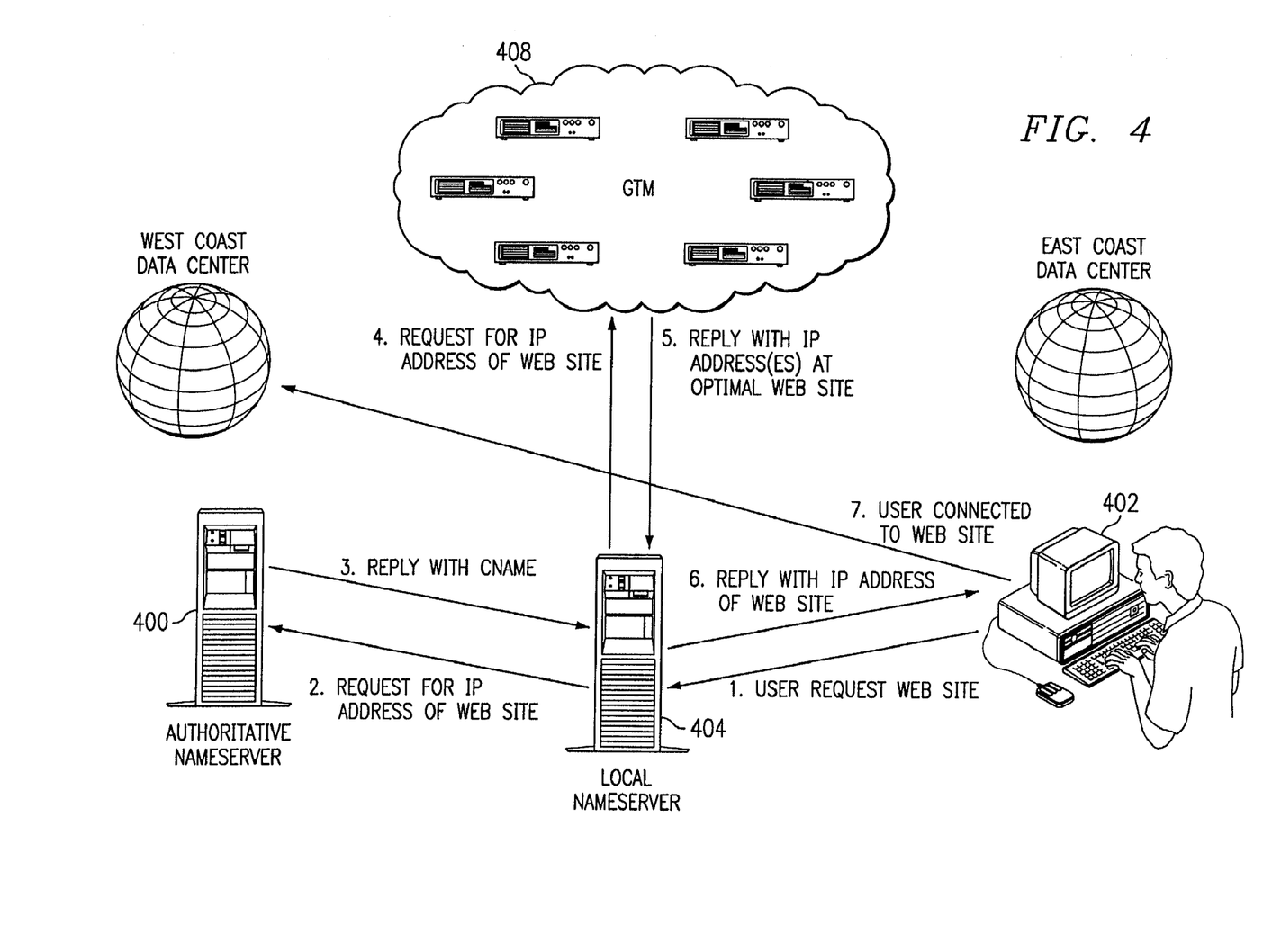
FIG. 4 is a simplified illustration of how an end user request is processed by the global traffic redirection system of the present invention for a mirrored web site that has been integrated into the managed service.

FIG. 4 illustrates how a customer web site is integrated into the traffic redirection system of the present invention. In a representative embodiment, it is assumed that the customer has a distributed web site of at least two (2) or more mirrored sites. The inventive system load balances multiple subdomains/properties provided they are in the same data centers. Integration simply requires that the customer set its authoritative name server 400 to return a CNAME to the GTM name servers 408, which, thereafter, are used to resolve DNS queries to the mirrored customer site. Recursion is also disabled at the customer's authoritative name server. In operation, an end user 402 makes a request to the mirrored site using a conventional web browser or the like. The end user's local name server 404 issues a request to the authoritative name server 400 (or to a root server if needed, which returns data identifying the authoritative name server). The authoritative name server then returns the name of a name server 408 in the managed service. The local name server then queries the name server 408 for an IP address. In response, the name server 408 responds with a set containing one or more IP addresses that are "optimal" for that given local name server and, thus, for the requesting end user. As described above, the optimal set of IP addresses is generated based on network maps created by testing the performance of representative core points on the network. The local name server selects an IP address from the "optimal" IP address list and returns this IP address to the requesting end user client browser. The browser then connects to that IP address to retrieve the desired content, e.g., the home page of the requested site.

Figure 5:
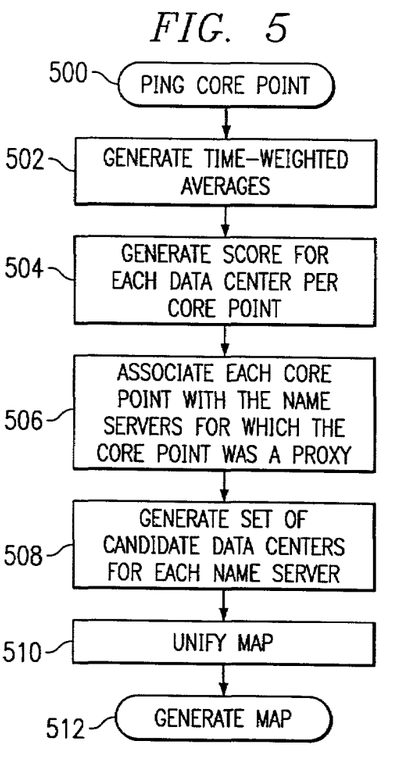
FIG. 5 is a flowchart describing how a map is generated by the GTM system.

FIG. 5 is a high level flowchart illustrating how data is processed in order to create a map. Periodically (e.g., every thirty (30) seconds), the network agents ping each core point from each data center. This is step 500. At each network agent, a time-weighted weighted average of latency, and a time-weighted average of loss, is computed. This is step 502. As will be described, the weights decay exponentially in time with a time constant that is configurable. At step 504, the data is further processed to produce a score for each data center per core point. At step 506, each core point is then associated with the name servers for which the core point was a proxy. At step 508, a map generation process goes through all of the data and decides a set of candidate data centers for each name server. At this time, any data centers that the web server agents determine are not "alive" are discarded. At step 510, the map generation process extends its decisions with respect to name servers to decisions with respect to IP block. A unifying algorithm is used to provide this functionality. This algorithm is described below.

Referring now back to FIG. 5, at step 512, the map is produced with the candidate for each block. If there are multiple candidates, the assignments are made to get as close to the load balancing targets are possible. The load balancing targets are defined, usually by the content provider, and these targets may be percentages (adding up to 100%) that breakdown the desired traffic amount by data center. This completes the map generation process.

As described above, step 502 involves generating a time-weighted average of latency and a time-weighted average of loss. More generally, this aspect of the invention provides a systematic methodology for predicting actual download times for various flow control protocols, e.g., TCP. As is known, TCP is the most commonly used flow control protocol on the Internet today. Other protocols are built on top of UDP. Neither TCP nor UDP packets can be used to monitor the state of routes on the Internet, however. According to the present invention, ICMP packets are injected into the network (e.g., by the network agents), at preferred points in time, and then routed to a suitably chosen intermediate core point. The system then looks at the behavior of the Internet induced by the ICMP probes by computing latency and packet loss. Latency is a measure of the round trip time (RTT) between the server and the core point. From maintaining a time series of loss and latency, the system is able to predict effectively the amount of time it would take a client (that uses a name server associated with the core point) to initiate and complete a download from the server. The quality of this prediction is important for effective mapping because when a client makes a web request and there are multiple web servers from which to potentially server, it is important to be able to predict correctly which web server has the best connectivity. This is a difficult problem in general because the Internet is highly bursty and exhibits highly variable traffic conditions.

The following example illustrates how the time-weighted averages are computed in accordance with one embodiment of the invention. Assume for purposes of example only that a content provider (FIG. 3) has mirror sites located at two data centers 300 (West Coast) and 302 (East Coast). The network agent "pings" the core point 305 from each data center. The network agent stores the latency and the packet loss for each measurement made. It should be understood that latency and loss parameters are merely representative of the types of signal transmission parameters that the network agent can track. Other parameters that could be measured include any parameter helpful in determining the speed, quality and/or efficiency of a network path, such as parameters indicative of outages on paths, loss in signal strength, error-control data, route changes, and the like.

For each "ping" to/from each data center to the core point, the respective network agent logs the data. Table 1 illustrates an example of the type of data that the network agent gathers over the course of measurements made every 30 seconds between the data centers and the core point. Table 1 is a table of latency measurements (data is in seconds (s)) and shows the current measurement (t=0) followed by measurements made previously.

TABLE 1

| Parameter | Data Center | Current | t-30 s | t-60 s | t-180 s | t-240 s | t-300 s | Avg (s) |
|---|---|---|---|---|---|---|---|---|
| Latency | (West) | 8.0 | 7.5 | 7.7 | 8.2 | 7.6 | 7.7 | 7.78 |
| | (East) | 3.0 | 3.5 | 3.2 | 3.8 | 3.6 | 3.4 | 3.42 |
| Loss | (West) | 0 | 0 | 1 | 0 | 1 | | N/A |
| | (East) | 0 | 0 | 0 | 0 | 0 | | N/A |

As Table 1 shows, based on latency, in this example the East Coast data center appears to have a smaller average latency to the core point than the West Coast data center. A time-weighted average of latency, and a time-weighted average of loss, is then computed. The weights decay exponentially in time with a time constant that is configurable (e.g., a time constant of 300 seconds). For a sequence of measurements made ($t_i$ $x_i$), where $t_i$ is the time of the $i^{th}$ measurement and $x_i$ is the value measured (e.g., $x_i$ can be the latency measurement $lat_i$ or the loss measurement $loss_i$), the time weighted average of latency is computed as:

$$AverageLatency = \sum_{i=0}^{\infty} lat \times e^{-t_i/C}$$

Assuming that the time constant C=300 seconds, and using the data of Table 1, the average latency time series is computed as:

$$AverageLatency = \sum_{i=0}^{\infty} lat \times e^{-t_i/300}$$

Using the data, the average latency for the data center 300 is computed as:

To compute the exponentially time weighted average, the network agent sums each weighted latency measurement (e.g., 31.88) and divides this sum by the sum of the weight factors (i.e., $e^{-30/300}+e^{-60/300}$ . . . etc.). Thus, the exponentially time weighed average latency for the data center 300 is computed as:

Exponentially time weighted average=31.88/4.0894

Exponentially time weighted average=7.795

As these computations show, the exponentially time-weighted average is 7.79, which differs from the computed average of 7.78. Although this difference does not appear significant in this example, it can be more significant for measurements averaged out over long periods of time, because more recent measurements will be given more weight than older measurements. The network agent determines dynamically whether core points that were once considered optimal are still so, whether core points that had been performing well (for a given time period) are now degraded, and the like. The exponentially time weighted averaging helps also to smooth out aberrations over time in measured data and helps to indicate trends.

Using the same information, the time weighted average latency for the East Coast data center 302 are computed in a similar manner. In addition, although not illustrated here, the network agent computes a time-weighted average of loss in the same way.

As described above, time-weighted averages are then processed to produce a score for each data center per core point. A preferred scoring function is as follows:

Score function=average latency+{[max (100, average latency)]*(penalty factor)},

Where the score is a value in milliseconds. Each of the values has a millisecond unit, except for the penalty factor, which is unit-less. The value "100" is a floor or base-level value, which represents the usual round trip time required for a packet to travel between the East Coast and the West Coast. The floor is variable. The term "max" refers to selecting either the value "100" or the average latency, whichever is greater. That value is then multiplied by a $$AverageLatency = \sum_{i=0}^{\infty} (8.0e^{0/300} + 7.5e^{-30/300} + 7.7e^{-60/300} + 8.3e^{-180/300} + 7.6e^{-240/300} + 7.7e^{-300/300})$$

$$AverageLatency = \sum_{i=0}^{\infty} (8.0(1) + 7.5(.9048) + 7.7(.8187) + 8.3(5488) + 7.6(.4493) + 7.7(0.3678)$$

$$AverageLatency = \sum_{i=0}^{\infty} (8.0 + 6.78 + 6.3.1 + 4.55 + 3.41 + 2.83)$$

$$AverageLatency = \sum_{i=0}^{\infty} (31.88)$$

penalty factor, with the result then being added to the average latency to generate the score. The penalty factor preferably is a function of the time weighted average loss. Thus, in one illustrative embodiment, the penalty factor is some multiple of the time weighted average loss. The multiplier may be varied, e.g., as a function of percentage of loss, with the penalty factor contribution being higher for greater packet loss. In a given embodiment, the scoring function may have the following variants:

For losses less than a given percentage (e.g., 10%), the scoring function is computed as:

Score=average latency+{[max (100, average latency)]*(10 * average loss)}

For losses greater than the given percentage, the score is computed as:

Score=average latency+{[max (100, average latency)]* ((110 * average loss)−10)}

The penalty factors in the scoring function variants are merely representative.

According to the invention, it has been found that a scoring function such as described above that is based on time-weighted average latency weighted by a time-weighted average loss penalty factor affords a good approximation or "proxy" of the download time for an average size (e.g., 10 Kbyte) file from the data center to an average end user. Of course, the file download time would be expected to vary as the file size is varied, but it has been found that the scoring function described above still tends to capture which data center of the mirrored set provides better performance. In other words, the absolute value of any given score is not as important as the data center-specific (e.g., East Coast vs. West Coast) values.

When the scores are provided to the map generation process, the network agent associates the core point with the local name server(s) for which the core point serves as a "proxy."

The following is a description of the unification algorithm. By way of background, one of ordinary skill in the art will appreciate that the core point discovery and related scoring process described above generates a relatively sparse (as compared to the entire Internet) data set that is then used to facilitate routing decisions. The unification algorithm enables a sparse core point/data center data set to a more generalized IP block/data center data set. At the outset, a set of IP address blocks, each specified by an IP address prefix and a bitmask length (as in Classless Inter-Domain Routing (CIDR)) is given. These IP address blocks are referred to as "upper bound" blocks. In the preferred embodiment, the IP address blocks are determined by combining the CIDR blocks specified in BGP routing tables retrieved from a set of Internet routers. As is known, an upper bound block is a contiguous range of IP addresses, and Internet routers typically publish such blocks. Most generally, a single "upper bound" block would consist of every IP address in the entire Internet.

The algorithm operates as follows. Each of the upper bound blocks is interpreted as determining a set of IP addresses (i.e., a "territory" of the upper bound block) defined as the set of all IP addresses which are contained in the given IP block and are not contained in any more specific upper bound block which is a sub-block of the given IP block. (In an alternate embodiment, the territory is defined more simply as the set of all IP addresses that are contained in the given IP block.)

The algorithm applies a given criterion for determining whether the data for all hosts in the territory of an upper bound block represent a unanimous decision that may be extended to the entire block. This criterion is referred to as the "unanimity criterion." In the preferred embodiment, the data consists of ping-based mapping decisions for each name server in the territory. Each mapping decision is either an optimal data center for the specified name server, or it is one of two special values: "no data" or "indifferent." The unanimity criterion in the preferred embodiment is that a set of data is unanimous if each data value identifies the same data center, ignoring those which are "no data" or "indifferent."

The algorithm extends the data in the IP address block map as follows. For each upper bound block, the algorithm determines whether all the data in the upper bound block satisfies the unanimity criterion. If so, the mapping decisions are considered to be unanimous; this unanimous decision is extended to all IP addresses in the territory of the upper bound block, and all of the data in more specific subsets of this territory is discarded. If all the data in the upper bound block does not satisfy the unanimity criterion, the upper bound block is divided into two sub-blocks, namely the two IP blocks determined by incrementing the bit mask length of the upper bound block and setting the first unmasked bit to either 0 or 1. The algorithm is then applied recursively to each of these two sub-blocks. Thus, if the unanimity criterion is not satisfied in the original upper bound block, the bound block is split into the largest possible sub-blocks in which the unanimity criterion is satisfied, and the unanimous decision of the data in each sub-block is extended to cover the entire territory of that sub-block.

Thus, a method of extending an IP address block map begins by defining a set of one or more upper bound block(s). These upper bound blocks are then used to partition a space of IP addresses into subsets or "territories", wherein each territory represents a largest set of IP addresses to which a piece of mapping data may be extended. The "piece" of mapping data typically consists of a host (usually a "name server" identified by the core point discovery process) IP address and some data about that host, namely, a "nearest" data center (e.g., as determined by the score processing) or a flag indicating that either "no data" exists for that host or that the system is "indifferent" as to which of a set of mirrored data centers the host should be mapped. The unification algorithm partitions the territory of each upper bound block into the largest possible sub-blocks in which a given unanimity criterion is satisfied and extending the mapping data in each such sub-block to all of the territory of that sub-block.

The upper bound blocks typically consist of the CIDR blocks contained in one more BGP routing tables. If desired, those CIDR blocks may be further subdivided according to "geo" location information.

Figure 6:
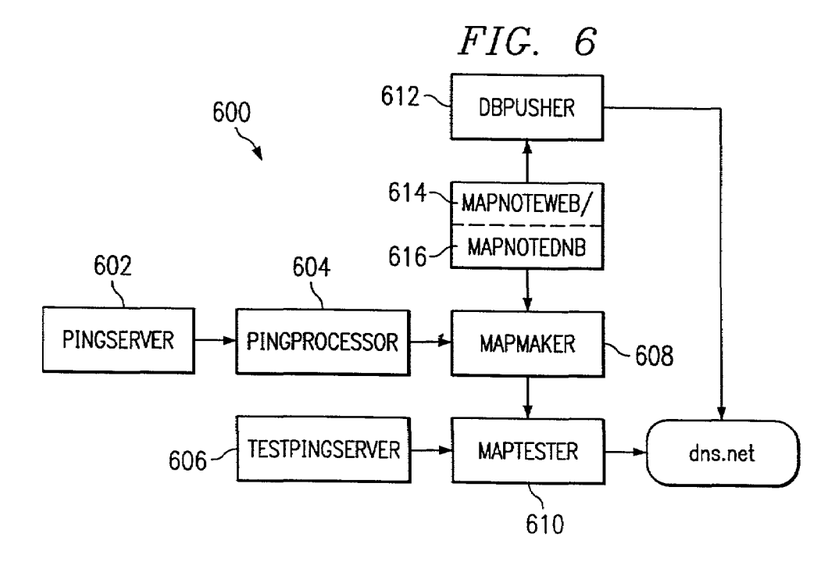
FIG. 6 is a simplified block diagram of one implementation of the global traffic management system of the invention.

The following describes a specific implementation of the global traffic redirection system as a managed service offering on behalf of content providers running mirrored web sites. FIG. 6 illustrates the overall system architecture 600. As noted above, these processes typically run across multiple servers in the system. There are three logical grouping of these processes. First, the PingServer 602, PingProcessor 604, and TestPingServer 606 are running on the network agents located in the content provider's data centers. Second, the MapMaker 608, MapTester 610, and DBPusher 612 are running on another set of servers. However, these may also be run on the network agent machines if there is a shortage of servers in the network in which the global traffic management system operates. Another set of processes, called MapNote Web 614 and MapNoteDNS 616, run together on a relatively static set of machines for all customers of the system. Processes 602, 604, 610, 612, 614 and 616 typically run continuously. An alert processor (not shown) detects if one or more machines on the network are non-functional and sends one or more corresponding alerts. An archive process (not shown) is used to automatically log files and other system files periodically. A file moving process (not shown) is used move data files. Each server may also run a generic process monitor (not shown), which reports data to a service provider query system.

As has been described, the global traffic management system 600 collects several pieces of data that results in a map being uploaded to the GTM name servers 615. At the beginning, Core Point Discovery (CPD) produces a list of IP addresses in a file (signifying the core points). This file is sent to each PingServer 602. Preferably, there is a PingServer process 602 running on each of the network agents that are deployed in a content provider's data center (not shown). In this embodiment, there is a pair of machines in each data center, only one PingServer process is primary. The other one is running but only takes over if the primary goes down. Each PingServer process 602 pings each of the core points approximately every 30 seconds.

Next, the ping results are sent to the PingProcessors 604. PingProcessors 604 preferably run on the same machines as the MapMakers 608, although this is not a requirement. The PingProcessors 604 process the ping results and drop the data files off for the MapMaker 608. MapMakers 608 also require data from the MapNoteWeb agents 614. The MapNoteWeb agents 614 are the web server agents that do test downloads from the content provider's web servers. These tests are used to determine aliveness of the webservers in the data centers as has been described.

The MapMaker 608 looks at the ping data as well as the MapNote Web data and creates a top-level map for the top-level name servers. The map is then sent to the MapTester 610 (which is usually running on the same machine). The MapTester 610 uses test ping data from the TestPingServer 606 to check a given number of (e.g., a few hundred) IP addresses in the map. This is done to make sure the map is correct, however, this processing is optional Finally, if the map passes the test, it is queued for uploading to the name servers 615.

DBPusher 612 is one other process that preferably runs on the same machines as the MapMaker process 608. This process is solely responsible for pushing out a DB file to the top-level name servers 615. This DB file completes the lookup data for the top-level name server 615. That is, the map from the MapMaker 608 contains a mapping of IP block to a virtual region number. The DB file is the data file that actually has a mapping of the region number to physical IP addresses. DBPusher 612 monitors the MapNote Web data and, in case of a failure, pushes an updated DB file to the name servers.

PingServer 602 is responsible for measuring RTT and packet loss to the list of core points 65. The list of core points 65 determined as follows. Preferably, there is a PingServer process running for each content provider at each data center in which a content provider is co-located. Thus, in one embodiment, the service provider deploys servers in all of a content provider's data centers. In another embodiment (not shown), ping data is shared for all customers who co-locate at a particular data center, and the GTM service provider may simply pre-deploy servers at "popular" hosting facilities to save time in integrating new customers to use the system.

The PingServer process preferably is run on each of the network agents in a data center. A leader election process (not shown) may be used to allow for the non-leader to take over if the primary fails within that same data center. PingServer includes a process that is used to ping a list of IP addresses, which the PingServer receives from a system source. Also, before the list is pinged, any IP addresses that are on a restricted list are filtered out. In particular, the primary inputs to the PingServer process are as follows:

Restricted tree—a list of IP addresses that are not pinged.
Routers file—the list of IP addresses that were discovered using Core Point Discovery.

The outputs of PingServer are as follows:
Ping results—raw results of pinging IP addresses.
Routers file—list of all IP addresses that PingServer used PingProcessor is responsible for taking the raw measurement data from PingServer and computing the time-weighted averages. The time-weighted average is computed both for RTT and packet loss measurements for the core points. The time-weighted average is computed as described above. The primary inputs to the PingProcessor 57 process are as follows:
Ping results from PingServer
Routers file from PingServer The outputs of PingProcessor are as follows:
Nameserver list
Processed ping data The MapMaker creates the map for the top-level name servers. MapMaker takes the processed ping data from PingProcessor and the aliveness data from MapNoteWeb and constructs a map. This map contains a relationship between certain IP blocks and a region number. The inputs to MapMaker are:
Nameserver list from PingProcessor
Ping scores from PingProcessor
BGP-Geo tree information The outputs of MapMaker may include, for example:
Debug map
Map states file
Map
Ping data MapTester is the last process before a map is uploaded to the top-level name servers. MapTester receives a candidate map from MapMaker. It then looks-up the mapping of a test IP addresses (that are pinged using TestPingServer, which is discussed more fully below). If the number of differences is below some threshold, then the map is deemed acceptable.

The map is then uploaded to the top-level name servers. The inputs to the MapTester process are:
Debug map
Test ping data
Stats file
Map
Ping data The output of the MapTester process is:
Map TestPingServer collects RTT and packet loss information for a small subset of IP addresses. This data is collected to ensure that the map produced by MapMaker is valid.

MapTester, assuming the map is good, will then load the maps to the top-level name servers. The inputs to the TestPingServer process are:
    Restricted tree
    List of IP addresses to test The output of the TestPingServer process is:
    Test ping data As noted above, because the MapMaker map only provides a mapping between IP block and a region number, a separate process preferably is used to provide the mapping between region number and the actual IP addresses of the webserver(s). DBPusher is responsible for processing the MapNoteWeb data and creating a DB file that is uploaded to the top-level name servers. Then, the top level name server will, after it has determined the region number for a give IP in the map, look in the corresponding DB file to find the right set of IP addresses to hand out. The input to DBPusher is:
    MapNote Web data The output to DBPusher is
    DB file for name servers—this file is pushed to the name server directly by DBPusher MapNote Web is run on a select number of servers for all customers using the traffic management system. MapNoteWeb uses a list of target URLs (which, for example, could be stored in its configuration files) on which it performs test downloads. Preferably, these tests are simple HTTP GET requests and only time and errors are important. This data can be interpreted to determine whether or not a data center or web server is alive on dead. The download time is stored historically using a time-weighted average. Both the MapMaker and DBPusher use this data. The input to MapNoteWeb is:
    Targets to measure against (stored in configuration file)

The output to MapNoteWeb is:
    Download test results

MapNoteDNS is related to MapNoteWeb, except that instead of monitoring web servers it monitors name servers. Its basic function is to do a measurement at a name server for certain names and report the time. If no answer comes back, the process will attempt to ping to determine whether it is the name server or the network that caused the failure. The inputs to MapNoteDNS are:
    Name servers to test
    What domains to test for The output of MapNoteDNS is:
    DNS query results Although not described in detail, various tests (that are not relevant to the present invention) may be executed to determine whether or not each of the above-described processes is running correctly.

The intelligent traffic redirection system of the present invention has numerous advantages. The system continuously pre-computes optimal maps for the user-based of the entire Internet (or, if desired, a given sub-portion thereof). It is able to do this effectively because the system reduces the scale of the problem by aggregating parts of the Internet and representing them with core points. The system is also able to make different kinds of measurements depending upon the service being replicated. It combines these measurements for the core points into decisions which it then extends to the entire Internet using unification over a fallback partition of the IP address space using, e.g., BGP and geo information. The system also is unique in its ability to balance load for cost minimization.

The system is able to pre-compute an optimal mapping for the entire Internet at all points in time. In addition to being extremely fast in its ability to react to bad network conditions, it is also extremely fine-grained in its response. The system is able to detect bad server conditions quickly and is capable of interfacing with a multitude of local load balancers. By computing core points, the system makes superior measurements that mitigate the problem of intruding on firewalls and other detection mechanisms. Moreover, unlike the prior art, it can load balance load so as to minimize bandwidth costs.

The unification algorithm is advantageous in that it uses high-quality reliable information for a subspace and extends it to the entire space rather than falling back onto poorer quality information. This is achieved by utilizing the natural tree-like hierarchy of CIDR-based IP addressing in conjunction with the fact that Internet routers utilize the CIDR scheme for aggregating IP addresses to permit fast lookups. The technique enables the redirection system to extend the benefits of high quality information from a subset of the entire space of IP addresses. This is of great importance because the Internet is experiencing exponential growth. The unification algorithm affords the service provider with a means to deal intelligently with new hosts that are accessing the CDN for the first time. Current technologies do not possess a means of extending mapping decisions in this way. They either fall back to poor quality information or use a default technique, e.g., such as round robin, which essentially embodies no information whatsoever.

Predicting download times using ICMP probes and time-series techniques also provides numerous advantages. The technique does not have any restriction on the range of file sizes and download types, and it makes intelligent use of ICMP probes of different sizes to effectively estimate packet loss. The technique requires very little state for keeping track of the time-series and is able to quickly compute a new estimate using an exponentially time-weighted average of all previous measurements and the new measurement. Rather than attempting to probabilistically model TCP flows, the inventive technique provides a general method for extracting a good predictor of download times based on ICMP probes.

In the preferred embodiment, the intelligent traffic redirection system is used to direct traffic to a mirrored Web site. Generalizing, the inventive system and managed service can be used in any situation where an end-user requires access to a replicated resource. As described above, the system directs end-users to the appropriate replica so that their route to the replica is good from a network standpoint and the replica is not overloaded. An "end user" may be generalized to any respective client system, machine, program or process. Thus, other uses of the system may include, without limitation, to direct caches to storage servers, to direct streaming servers to signal acquisition points, to direct logging processes to log archiving servers, to direct mail processes to mail servers, and the like.

Having thus described our invention, the following sets forth what we now claim.

The invention claimed is:

1. A method of determining which of a set of content provider mirror sites should receive an end user's initial request, comprising:
    generating a network map during a map generation process according to the following sub-steps:
        dynamically determining a set of proxy points, wherein each proxy point of the set of proxy points is determined by directing a trace route from each of a set of content provider mirror sites toward a given local name server and determining a given point in the Internet where the trace routes from each of the set of content provider mirror sites intersect;

probing each of the proxy points from each of the set of content provider mirror sites to generate given data;

generating a download predictor score for each content provider mirror site based on the given data generated by probing the proxy points;

identifying which mirror site provides a best download performance based on the download predictor score; and associating a given name server IP address with the identified mirror site to generate the network map; and upon completion of the map generation process, in response to an end user's initial request to a given local name server, returning an IP address of the identified mirror site based on information in the network map.

2. A method, operated by a server provider, for managing global traffic redirection for a set of content providers operating mirrored sites, wherein the service provider is distinct from the set of content providers operating the mirrored sites, comprising:

for each content provider in the set of content providers, generating a network map during a map generation process according to the following sub-steps:

dynamically determining a set of proxy points, wherein each proxy paint of the set of proxy points is determined by directing a trace route from each of a set of data centers that host mirrored sites for the content provider toward a given local name server and determining a given point in the Internet where the trace routes from each or the set of data centers intersect;

from each of set of data centers that host mirrored sites for the content provider, executing a given network test against each of the set of proxy points;

generating a time-weighted average of a given network performance metric based on data generated by executing the given network test;

generating a score for each data center per proxy point;

generating a set of candidate data centers for each of a set of name servers;

associating a candidate data center to each of a set of IP address space blocks to generate the network map;

providing the network map to a name server; and using the network maps generated for the set of content providers to direct end user requests to a mirrored site to a given data center.

3. The method as described in claim 2 wherein the given network test is a ping test.

4. The method as described in claim 2 wherein the given metric is latency or packet loss.

5. The method as described in claim 2 further including the step of discarding from the set of candidate data centers any data center that does not meet a given operating criteria.

6. The method as described in claim 5 wherein the given operating criteria is evaluated using a file download test.

7. A method of determining which of a set of mirror sites should receive a request to a domain that is replicated at the set of mirror sites, comprising:

generating a network map during a map generation process according to the following sub-steps:

dynamically determining a set of proxy points, wherein each proxy point of the set of proxy points is determined by directing a trace route from each of a set of mirror sites toward a given local name server and determining a given point in the Internet where the trace routes from each of the set of mirror sites intersect;

probing each of the proxy points from each of the set of mirror sites to generate given data;

generating a score for each mirror site based on the given data generated by probing the proxy points;

identifying which mirror site provides a best performance based on the score; and associating a given name server IP address with the identified mirror site to generate the network map; and upon completion of the map generation process, and responsive to a local name server making a request associated with the domain, receiving the request at a name server associated with the network map; and having the name server associated with the network map use the network map to return to the local name server an IP address identifying a preferred mirror site at which the request may be serviced.

8. The method as described in claim 7 wherein the request originates at a client machine and the domain is associated with a content provider Web site.

9. The method as described in claim 7 wherein the request originates from a content delivery network edge server and the set of mirror sites comprise storage servers.

10. The method as described in claim 7 wherein the request originates at a streaming server and the set of mirror sites comprises a plurality of signal acquisition points.

11. The method as described in claim 7 wherein the request originates at a logging process and the set of mirror sites comprises a plurality of log archival servers.

12. The method as described in claim 7 wherein the request originates at a mail process and the set of mirror sites comprises a plurality of mail servers.

* * * * *